United States Patent [19]

Marchand

[11] Patent Number: 4,762,050
[45] Date of Patent: Aug. 9, 1988

[54] ROTARY HYDRAULIC ACTUATOR

[75] Inventor: Eric Marchand, Porrentruy, Switzerland

[73] Assignee: ACED S.A., Switzerland

[21] Appl. No.: 921,446

[22] Filed: Oct. 22, 1986

[30] Foreign Application Priority Data

Oct. 23, 1985 [CH] Switzerland ............... 4556/85

[51] Int. Cl.$^4$ ............................................. F15B 31/12
[52] U.S. Cl. ......................................... 91/1; 91/420; 92/156
[58] Field of Search ................ 91/1, 420, 46; 92/156

[56] References Cited

U.S. PATENT DOCUMENTS

| | | | |
|---|---|---|---|
| 3,641,875 | 2/1972 | Kodalle | 91/1 |
| 3,832,935 | 9/1974 | Syassen | 92/156 |
| 3,892,165 | 7/1975 | Lioux | 91/420 |
| 3,933,061 | 1/1976 | Link | 82/30 |

FOREIGN PATENT DOCUMENTS 102805 3/1984 European Pat. Off.
471328 5/1969 Switzerland.

Primary Examiner—A. Michael Chambers
Attorney, Agent, or Firm—Parkhurst & Oliff

[57] ABSTRACT

The annular transmission block (13) is pressed against the transmission face (8) of the cylinder (5) when the oil pressure arrives via the duct (17). At that moment, one of the two grooves (19 or 10) can supply one of the two ducts (9 or 10) in such a way that the oil pressure is transmitted across the fluid-retaining devices (11 and 12) to one of the two ends of the chamber (4). The pressure-maintaining device (25) is then charged by stressing its spring (27) and the piston (6) moves into the chamber (4) of the cylinder, carrying along the clamp chuck (7).

11 Claims, 3 Drawing Sheets

ROTARY HYDRAULIC ACTUATOR

The automatic control of modern machine tools requires operating means that are more flexible and more reliable than those known from the prior art so as to ensure, for example, the opening and closing of the collets that turn the workpieces or the bars of unprocessed material in which the pieces are shaped. In addition, these clamping means must be able to develop large torques at very high speeds of rotation.

Hydraulic control devices are known in the art, but it is known that the design of these devices requires that the problems existing in transmitting the control-fluid pressure from the fixed part of the hydraulic circuit to the rotating part be properly solved. The rotary seals used heretofore have the tendency, when operating at high speed and transmitting high pressures, to produce inadmissible heating which is detrimental to the reliability and to the durability of the machines.

Thus, for example, the specification of French Pat. No. 2,180,425 proposes, for the transmission of the pressure from an inlet connection, the provision in the bore of the fixed part an annular groove and, facing said groove, in the rotating part, a bore through which the oil pressure is transmitted to a chamber that communicates with the cylinder of the actuator via a duct normally closed by a ball valve. For the pressure to be transmitted, it is necessary to provide between the rotary part and the fixed part a clearance that functions as a labyrinth and produces a large pressure drop. This arrangement, as well as others of the same kind such as that described in U.S. Pat. No. 3,933,061 and which has in the rotary seal a distribution device which transmits the pressure continuously, results in the disadvantages described above.

The present invention aims at proposing a new solution to this problem and, to accomplish this, it has as its object the provision of a rotary hydraulic actuator for controlling the gripping or loosening of a collet or a mandrel of a machine tool, comprising a piston which is integral with a pull rod, a control cylinder integral with a spindle body, and a hydraulic control circuit which, itself, is comprised of a stationary part supported by fixed elements and a rotating part supported by the spindle body, wherein the rotating part of the control circuit comprises means for retaining the control fluid and means for maintaining this fluid under pressure, and wherein transmission means are located between said part of the circuit so as to connect them temporarily to each other during a control operation.

One embodiment will now be described hereinafter, by way of example, with reference being made to the accompanying drawings, in which.

Figure 1:
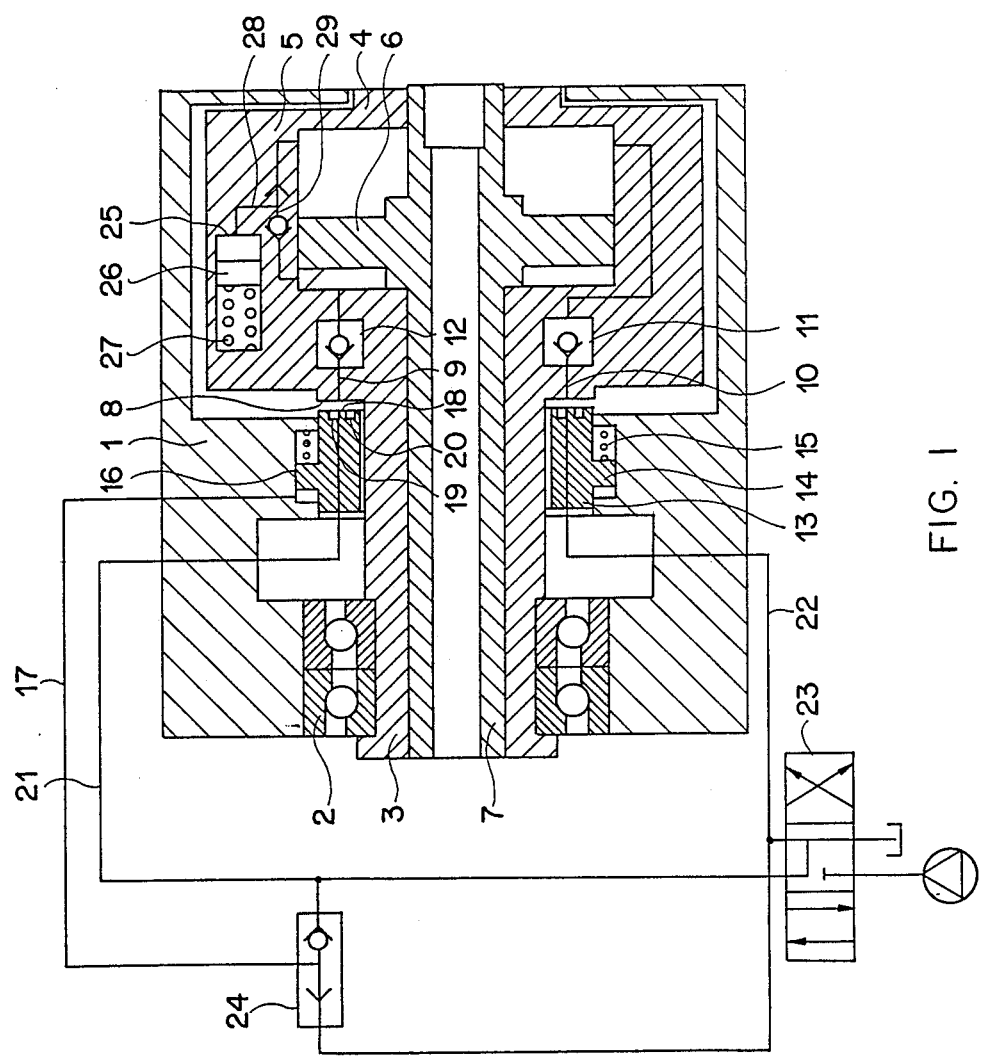
FIG. 1 is a schematic view showing the operating principle of the device and of its main components.

The device shown in the drawing is provided with means that are associated with the rotating part of the circuit and which act to maintain the pressure in the cylinder once the command has been given, so that the water seal no longer has to transmit the pressure continuously as in prior art devices. This performance results from the pressure of a transmission block, as will be seen hereinafter.

FIG. 1 is a schematic representation of the principle of the device. Frame 1 represents, for example, the headstock of a lathe. Bearings 2 support in this headstock a spindle body 3, which is rotated by devices that are not shown herein. At its front part, the spindle body 3 has a chamber 4 whose wall forms a cylinder 5 and in which slides a piston 6 which is integral with the clamp chuck 7. This clamp chuck is connected by known means to a collet (not shown) in such a way that displacement of the clamp chuck 7 in an axial direction between the advanced position and the drawn-back position will cause the collet to open and/or to close on a workpiece or on a rod, if necessary on a tool holder, in case said device is used to ensure the control of a tool.

Cylinder 5 has on its left side an annular and flat transmission surface 8 into which orifices open that are in communication with ducts 9 and 10 made in the interior of cylinder 5 and ending at each of the two sides of piston 6. Retaining means 11 and 12 are disposed in the interior of cylinder 5 in the path of ducts 10 and 9. These retaining means are represented in FIG. 1 by simple ball valves but, as will be seen hereinafter, these devices are so designed that they react at the moment a command is given to move in order to open the depressurizing ducts and to keep them open while opening the pressurizing ducts only to the extent necessary to enable the oil to pass without loss of pressure. Moreover, the functions of the two devices 11 and 12 are reversed, depending on the direction of movement of the piston 6 that must be controlled.

Between headstock frame 1 and spindle body 3 is located a transmission block 13 consisting of an annular piece which is coaxial with spindle 3. This piece has a flange 14 acting as a piston, which is loaded by a spring 15 and is housed in a recess 16 that can be supplied with oil under pressure across frame 1 by a duct 17. This transmission block 13 has a flat and annular face 18 which faces transmission surface 8 and in which two annular grooves 19 and 20 are made whose radii correspond to the distances between the axis of rotation of the device and the openings of ducts 9 and 10 in transmission surface 8. The latter is a rotating surface, while transmission surface 18 is a stationary one. Normally, spring 15 keeps the block separated from transmission surface 8. On the other hand, when a command is given for the displacement of clamp chuck 7, the oil pressure exerted in back of piston 14 will cause transmitting surface 18 to press against transmission surface 8. Thus, one of grooves 19 and 20 in communication with two control ducts 21 and 22 is in communication with the compressed oil and the other is in communication with the depressurizing duct. Valve 23 ensures the control of operations. It permits ducts 21 and 22 to be used alternatively as pressurizing and depressurizing ducts, while duct 17, which is connected to the device by valve 17, conveys the compressed oil with each control movement.

Therefore, there is friction between surfaces 18 and 8 only during the control operations. However, pressure-maintaining means are provided in the interior of cylinder 5 to keep chamber 4 under pressure. In FIG. 1, these devices are represented by a cylindrical chamber 25 in which slides a free piston 26 which itself is subjected to the thrust of a spring 27. The end of chamber 25 opposite spring 27 is in communication, via ducts 28 and ball valve 29, with the end of chamber 4 in which the compressed oil enters. Therefore, the oil entering therein will, on the one hand, cause piston 6 to be displaced and, on the other hand, piston 26 to be pressed back against the action of spring 27 in chamber 25. The volume of oil transmitted in this way will correspond to the stressing of spring 26, so that the latter will thereafter maintain piston 6 under pressure despite possible leaks that might occur during the operation of the device. In this connection, it is noted that, with each movement, oil leaks are automatically compensated for, since the quantity of oil entering cylinders 4 and 25 will necessarily ensure the stressing of spring 27 to the required value.

Figure 2:
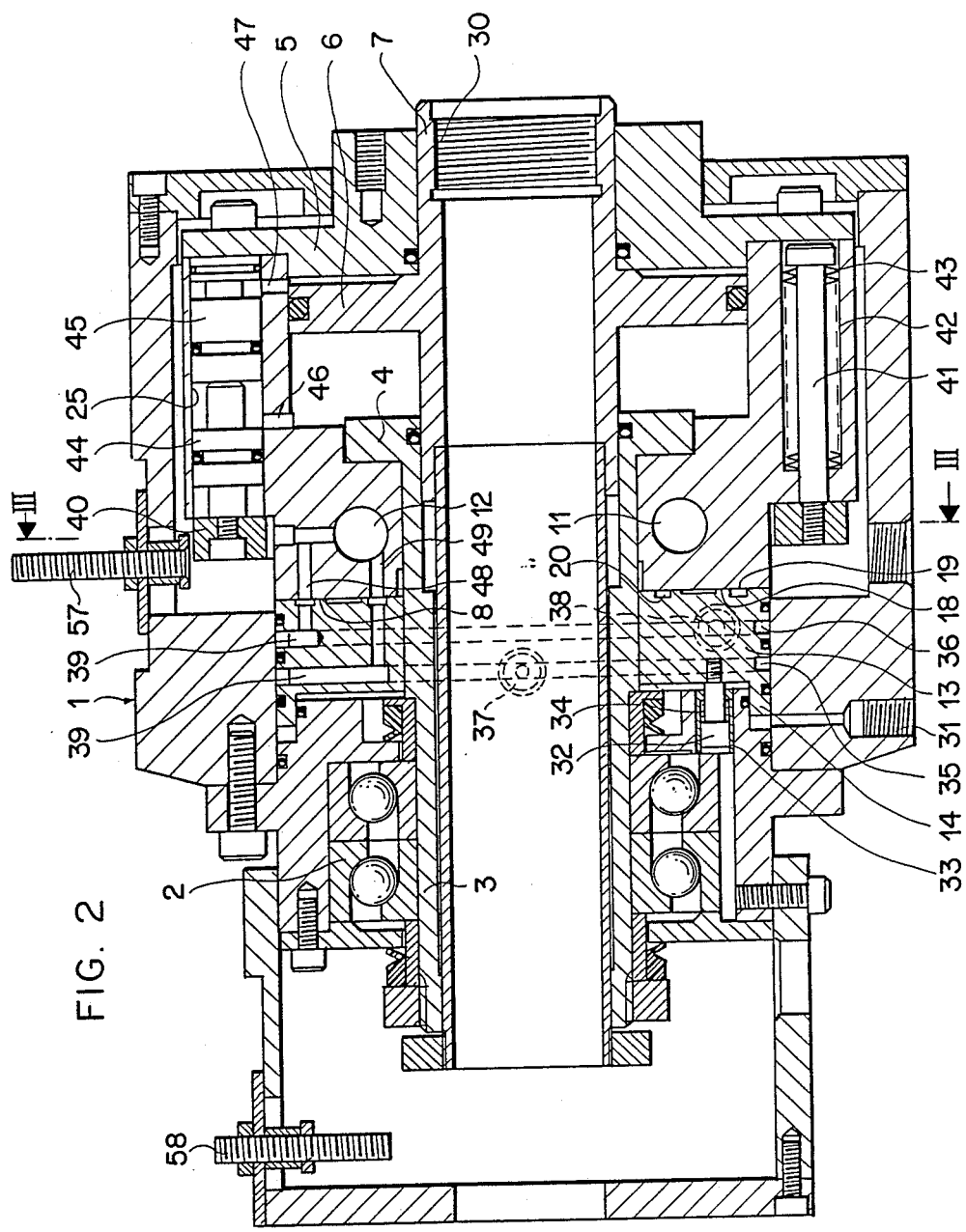
FIG. 2 is a more detailed sectional view of an embodiment of the device.
Figure 3:
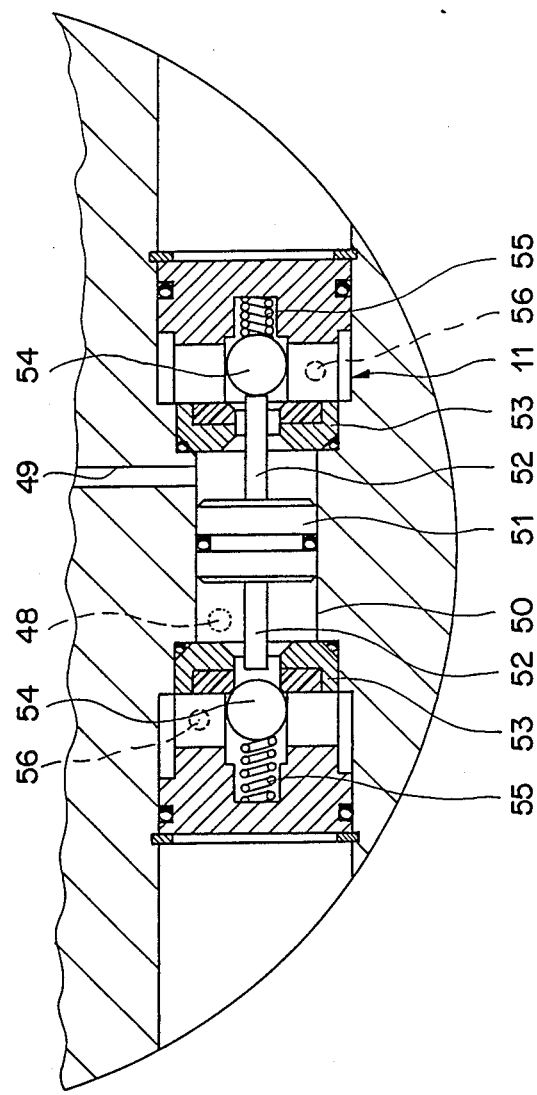
FIG. 3 is a partial sectional view of an enlarged scale taken along the line III—III of FIG. 2, showing one of the fluid-retaining means mounted in the spindle.

FIGS. 2 and 3 show in greater detail one embodiment of the invention, whose principle is illustrated in FIG. 1. This figure shows frame 1, bearings 2, spindle body 3 which, in this case, is comprised of several pieces that need not be described in detail herein, part 5 of the spindle body constituting the control cylinder defining the chamber 4 in which slides the piston which is integral with clamp chuck 7. In front of this clamp chuck is visible the threading 30, which permits a pull rod, which is capable of actuating the clamping cone of the chuck, to be attached to this chuck. Transmitting surface 8 of cylinder 5 is turned toward the stationary transmitting surface 18 of transmission block 13, whose rear flange 14 engages in a casing, which can be supplied with compressed oil via an inlet connection 31, to which will be connected the duct labeled 17 in FIG. 1. In this case, screws 32 sliding in bushing 33 and loaded by springs 34 ensure the working of spring 15 depicted in FIG. 1 and normally keep transmission block 13 separated from cylinder 5.

To feed the transmission block, there are provided in its external cylindrical surface grooves 35 and 36 which, when the transmission block is in the active position, communicate with ducts (not shown) made in frame 1 and connected on the circumference of frame 1 with pressurizing and depressurizing pipes 21 and 22. The connections in question are shown at 37 and 38 in FIG. 2. With regard to grooves 19 and 20 made in transmission surface 18, they communicate via bores 39 with supply grooves 35 and 36 and, thereby, with ducts 21 and 22.

With regard to the pressure-maintaining devices, they include, in the embodiment shown in FIG. 2, a holding ring 40, to which are fixed a series of rods 41 engaged in the housings 42 of cylinder 4, springs 43 being inserted into said housings. Thus, ring 40 is constantly being pressed against a frontal annular surface of cylinder 5 in which surface open cylindrical housings that correspond to housings 25 of FIG. 1. It is understood that housing 25 and housings 42 are interposed on the circumference of cylinder 5. Into each of the housings 25 are inserted two pistons 44 and 45 which operate as device 29. In effect, the space between the two pistons 44 and 45 communicates via a bore 46 with the rear end of chamber 4, while the space between pistons 45 and the bottom of housing 25 communicates with the other end of chamber 4 through a bore 47. Therefore, when the oil pressure arrives at the rear end of chamber 4, it is transmitted into housing 25 between the two pistons 44 and 45, so that only piston 44 is pushed back toward the left, stressing springs 43. Piston 45 then acts as an obturator plug with respect to duct 47. It will be understood that the right end of chamber 4, i.e., the front face of piston 6, is then made to communicate with the oil depressurizing duct by means of devices not shown herein but which will be discussed hereinafter. It will be noted that ring 40 can travel rearwardly a fairly long distance, so that the volume of oil that can be contained between the two pistons 44 and 45 makes it possible to compensate for possible leaks during the operation of the device without lowering the pressure in chamber 4.

When a movement of piston 6 from right to left is commanded, the oil pressure is transmitted to the right end of chamber 4, so that it is exerted on the front end of piston 45. The two pistons are then pushed back to the left against the action of springs 43. During this time the left part of chamber is made to communicate with the depressurizing duct, which enables the desired stroke to be effected.

The two fluid-retaining devices 11 and 12 are mounted in two parallel bores made in the interior of cylinder 5. They are each in communication, on one side, with the two grooves 19 and 20 of the transmitting block via ducts 48 and 49 and, on the other side, with the two ends of chamber 4. FIG. 3 shows retaining device 11. In the central chamber of the device 50, there slides a piston 51 having two rods 52. Cylinder 50 is connected on either side of piston 51 with ducts 48 and 49. It is bounded at its two ends by seats 53, against which are pressed balls 54 loaded by springs 55, said seats being housed in widened parts of the transverse bore containing the device. As shown in the drawing, each of the seats 53 permits communication between one of the two ducts 48 or 49 and one of the two chambers in which balls 54 are located. Into each of these chambers open a duct 56 connecting the retaining device to one of the two ends of chamber 4.

The device operates as follows:

If, for example, the oil pressure is directed from valve 23 to connection 38, groove 36 of the transmitting block and, consequently, duct 48 of cylinder 5 will be under pressure. In this case, piston 51 of device 12 will be displaced to the right. The oil pressure will raise ball 54 situated on the left side, so that the corresponding duct 56 will receive the oil pressure. The other ball 54, on the other hand, will also be separated from its seat, but by the action of rod 52. Duct 56 situated to the left of device 12 will be supplied with compressed oil as long as the pressure continues to prevail, while duct 56 situated at the other end of device 12 connected to the other end of chamber 4 will be connected to the oil depressurizing duct as long as piston 51 keeps ball 54 separated from its seat. If the oil pressure arrives via duct 49 in the interior of chamber 50, the ducts will be reversed and the piston will move in the other direction. The two devices 11 and 12 operate in parallel and the presence of two devices improves the reliability and safety of the operation.

The command for the movements of the elements described above is given by an electronic circuit connected to the machine tool's general control system. Thus, valve 23, which controls the arrival of the oil pressure at duct 21 or duct 22—the other duct being placed in the depressurizing status—is actuated according to a preset program. Moreover, position detectors 57 and 58 monitor, respectively, ring 40 and clamp chuck 7. These detectors ensure the stoppage of the supply of compressed oil in the moment the elements in question are in their final position.

Thus, a device is achieved which is very reliable, compact, and has an extremely high hydraulic efficiency. This device makes it possible to control clamp chucks in spindles rotating at very high speeds because of the fact that the transmission of pressure between the fixed part and the rotating part is effected only during the control operations. The interior spaces of the spindle body containing the compressed oil are in communication with the pressure-maintaining means acting under the effect of springs 43. In this way, both the oil losses resulting from leaky rotary seals and the heating heretofore inevitable, if the seals were tight, are prevented.

The control device is self-contained and can be mounted as an auxiliary means on the headstock of a lathe, for example, at the rear thereof. It can also be integrated into the headstock.

I claim:

1. A rotary hydraulic actuator for controlling the gripping or loosening of a collet or a mandrel of a machine tool, comprising:
   a piston which is integral with a pull rod;
   a control cylinder which is integral with a spindle body;
   a hydraulic control circuit comprising a stationary part supported by fixed elements and a rotating part supported by the spindle body, the rotating part of the control circuit comprises means for retaining control fluid and means for maintaining said control fluid under pressure, and transmission means are disposed between individual parts of said hydraulic control circuit in order to connect them temporarily to each other during a control operation;
   wherein said means for maintaining fluid under pressure comprises a series of parallel casings acting as accumulators, pistons sliding in said casings, a series of springs acting in parallel with said casings and interposed between said casings and a connecting ring loaded by the springs and by the pistons, such that, when the control cylinder is put under pressure, the fluid pressure acts on the auxiliary pistons and moves the connecting ring in such a manner as to stress said springs, thereby preventing the pressure from dropping in the control cylinder and in the casings even in the event of oil leakage.

2. A rotary hydraulic actuator for controlling the gripping and loosening of a collet or a mandrel of a machine tool, comprising:
   a fixed frame and a rotary part comprising a spindle body rotatably mounted within said frame;
   a pull rod located within said spindle body and axially movable therein;
   a piston part integral with said rod;
   a cylinder chamber provided within said spindle body and locating said piston part; and
   control means for controlling axial displacement of said rod within said spindle body, for gripping and loosening said collet or mandrel under a predetermined force, wherein said control means comprise, on the one hand, outer feeding means in said frame, pressure transmission means between said frame and said spindle body, and, on the other hand, auxiliary chamber means within said rotary part hydraulically connected to said cylinder chamber, auxiliary piston means movable within said chamber means, spring means acting on said auxiliary piston means, and valve means for controlling closing and opening of a communication between said cylinder chamber and said transmission means.

3. The hydraulic actuator according to claim 2, wherein said pressure transmission means comprise an axially movable transmission block belonging to said frame, parallel flat transmission surfaces on said block and said spindle body respectively, means for intermittently pressing said surfaces against one another, and corresponding duct means in said block and body respectively.

4. An actuator as set forth in claim 3, wherein said transmission means comprises:
   a transmission block which can move alternately between an active position, in which two corresponding transmission surfaces of the spindle body and the transmission block, respectively, are pressed against each other, and an inactive position, in which said two surfaces are separated, and wherein the transmission block has internal ducts which connect exterior openings, the latter being situated in the transmission surface of the block.

5. An actuator as set forth in claim 4, wherein said interior openings are formed by annular grooves located entirely in the transmission surface of the block, and wherein the rotating part of the hydraulic control circuit comprises control ducts which open into the transmission surface of the rotating part facing said grooves, said ducts being connected to each of a cylinder chamber and each being provided with means for retaining the control fluid.

6. An actuator as set forth in claim 5, wherein each means for retaining the control fluid constitutes a valve means comprising two spring-loaded obturator plugs placed in opposing valve bodies and, between said valve bodies, a chamber in which slides a valve piston with two opposing rods, such that each obturator plug, when it is in a closed position, maintains the valve piston in such a position that the other obturator plug is necessarily in an open position.

7. An actuator as set forth in claim 4, wherein the transmission block is loaded by elastic elements which tend to separate said transmission block from the transmission surface of the rotating part of the circuit, and wherein hydraulic control means acts thereon to press it against said transmission surface of the rotating part as the moment of action.

8. An actuator as set forth in claim 7, wherein the transmission block is an annular piece coaxial with the spindle and wherein the transmission surfaces are flat surfaces, the displacement of the transmission block being parallel to the axis of the spindle.

9. An actuator as set forth in claim 3, wherein the stroke of the pistons and that of the connecting rings are monitored by position detectors which automatically control the triggering of the supply of control fluid of the actuator.

10. An actuator as set forth in claim 2, wherein the means for maintaining the control fluid under pressure are incorporated into the pistion.

11. An actuator as set forth in claim 2, wherein the means for maintaining the control fluid under pressure are incorporated into the control cylinder.

* * * * *